United States Patent [19]

Arnold et al.

[11] 3,760,282

[45] Sept. 18, 1973

[54] DATA RECOVERY SYSTEM

[75] Inventors: Robert W. Arnold, Glen Aubrey; Louis V. Galetto, Apalachin, both of N.Y.

[73] Assignee: International Business Machines Corporation, Armonk, N.Y.

[22] Filed: Mar. 29, 1972

[21] Appl. No.: 239,022

[52] U.S. Cl.......... 328/116, 307/235 A, 307/235 R, 328/117, 328/150

[51] Int. Cl........................... H03k 5/20, H03k 5/18

[58] Field of Search...........328/115–117, 150–151; 307/235 R, 235 A

[56] References Cited

UNITED STATES PATENTS 3,585,507 6/1971 Bickel............................ 328/151 X

*Primary Examiner*—John Zazworsky
*Attorney*—George E. Clark et al.

[57] ABSTRACT

A system for recovering data subject to amplitude and phase variations including one or more threshold detectors having a hysteresis effect, a peak detector for detecting the positive and negative peaks of a data input signal voltage, gating circuits for logically combining the outputs the threshold detectors with the output of the peak detectors to recover data subject to amplitude and phase variations.

5 Claims, 9 Drawing Figures

Patented Sept. 18, 1973

3,760,282

5 Sheets-Sheet 3

DATA RECOVERY SYSTEM

BACKGROUND OF THE INVENTION

The present invention relates to data recovery systems and more particularly to data recovery systems employing analog to digital conversion circuits and digital combinational logic circuits.

In the prior art, there are many systems used for recovering data subject to amplitude and phase variations. These variations are sometimes referred to as "jitter." One of the most common systems for data recovery is that in which the input signal subject to jitter is connected to a threshold detector having a fixed reference level to reject noise and produce a usable data output signal.

However, because of wide variations in amplitude of the input signal voltage to the data recovery system, the single threshold detector with fixed reference level which must be adjusted to accept a minimum value of signal voltage, results in jitter being passed to the output of the threshold detector with a resulting uncertainty in the data.

Therefore, it is an object of the present invention to accurately recover data which is subject to amplitude and phase variations.

It is another object of the present invention to recover data subject to jitter by a data recovery system including peak detecting means, threshold detecting means and gate means for combining the outputs of the threshold detecting means and the peak detecting means to eliminate jitter on the recovered data signal.

It is a further object of the present invention to recover data subject to jitter in a data recovery system including peak detecting means, threshold detecting means and gating means, in which the threshold detecting means includes hysteresis for increasing signal to noise ratio.

It is a still further object of the present invention to recover data subject to jitter in a data recovery system wherein bipolar input signals are detected by respective positive and negative threshold detecting means and respective positive and negative peak detecting means for accurate recovery of data.

SUMMARY OF THE INVENTION

Accordingly, to achieve the objects stated above, an embodiment of the present invention includes amplifying means for raising the level of an input data signal subject to jitter to a value suitable for data recovery, peak detecting means for detecting the peak value of the input signal and producing a digital output pulse, threshold detecting means for detecting the presence of a predetermined threshold level of the input signal, in which the threshold level switches to a second value to achieve a longer output pulse and improve signal-to-noise ratio; logical AND means for combining the output of the peak detecting means with the output of the threshold detecting means to obtain a stable recovered data output signal.

An important advantage of the data recovery system according to the present invention is that reliable, stable, and jitter-free data signals may be obtained from a sonic delay line storage system.

The foregoing and other objects, features and advantages of the present invention will be apparent from the following more particular description of preferred embodiments of the invention, as illustrated in the accompanying drawings.

DETAILED DESCRIPTION

Figure 1:
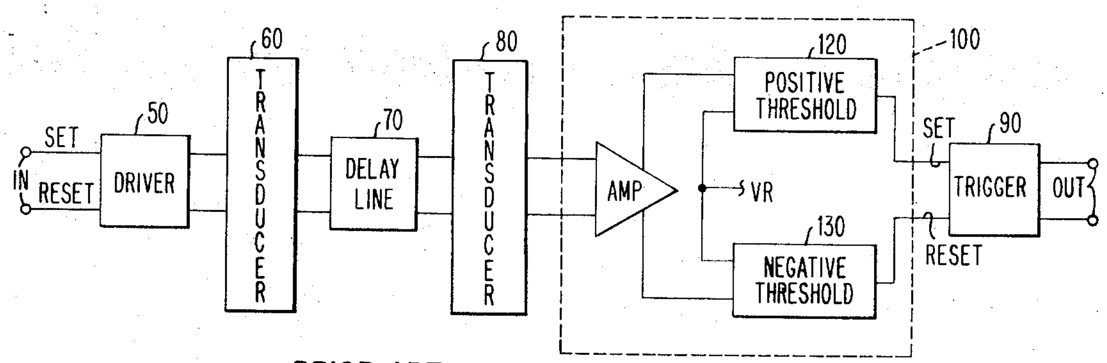
PRIOR ART FIG. 1
FIG. 1 is a block diagram of a prior art sonic delay line system including data recovery system.

Referring now to FIG. 1, a delay line storage system is shown which includes prior art data recovery system 100.

An input signal is presented to driver 50 which supplies an electrical signal of sufficient power to activate transducer 60 which converts the electrical signal into a mechanical signal. The mechanical signal is delayed by magneto strictive delay line 70 which after a time delay presents an output to mechanical to electrical transducer 80.

Prior art data recovery system 100 includes amplifier 110 which receives as its input the output of transducer 80; positive threshold detector 120; and negative threshold detector 130. Amplifier 110 presents inputs to threshold detectors 120, 130 wherein the respective positive and negative thresholds are detected against a predetermined reference level. When the positive threshold detector produces an output, data trigger 90 is set which represents the presence of a data bit. When a negative threshold level is detected by threshold detector 130, data trigger 90 is reset which represents the presence of a next data bit in a not-return-to-zero data transmission system.

Prior art data recovery system 100 is subject to positional inaccuracies in data due to wide variations in amplitude of the signal output from amplifier 110 resulting in early or late detection of threshold levels with respect to true data bit time position.

Figure 2A:
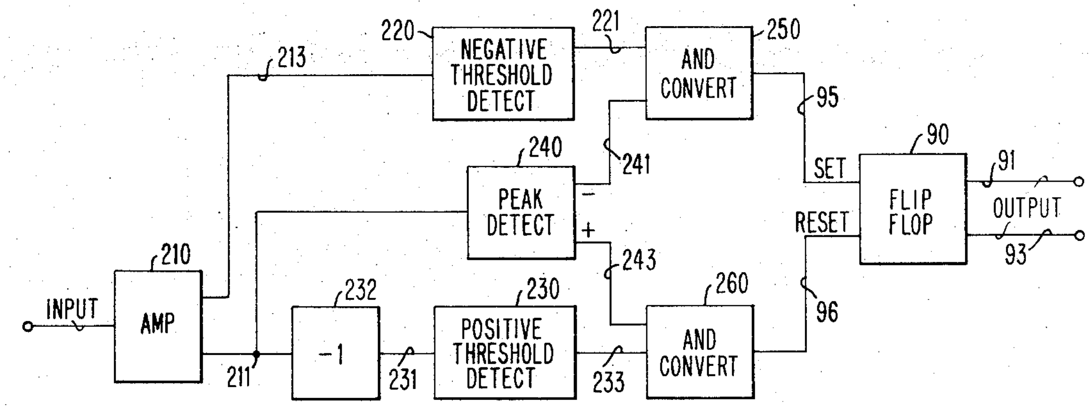
FIG. 2*a* is a block diagram of a preferred embodiment of a data recovery system according to the present invention.
Figure 2B:
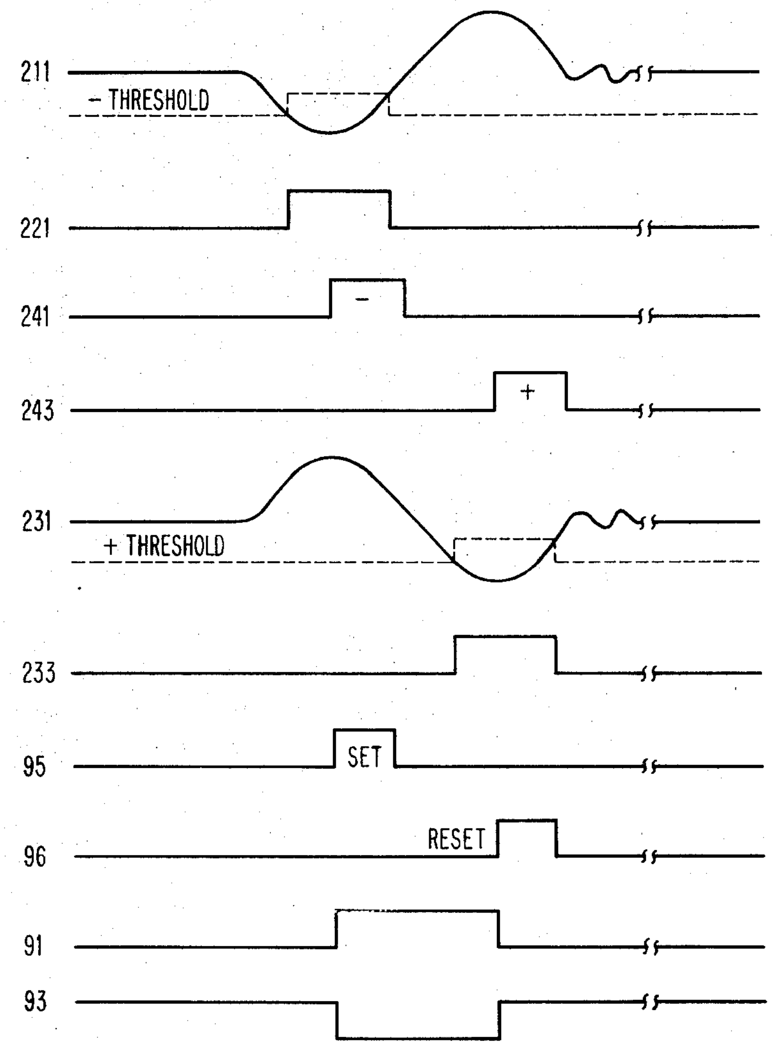
FIG. 2*b* is a timing chart which shows the operation of the system of FIG. 2*a*.

Referring now to FIGS. 2*a* and 2*b*, a preferred embodiment of the present invention is shown in which non-return-to-zero data transmission is employed.

Figure 4:
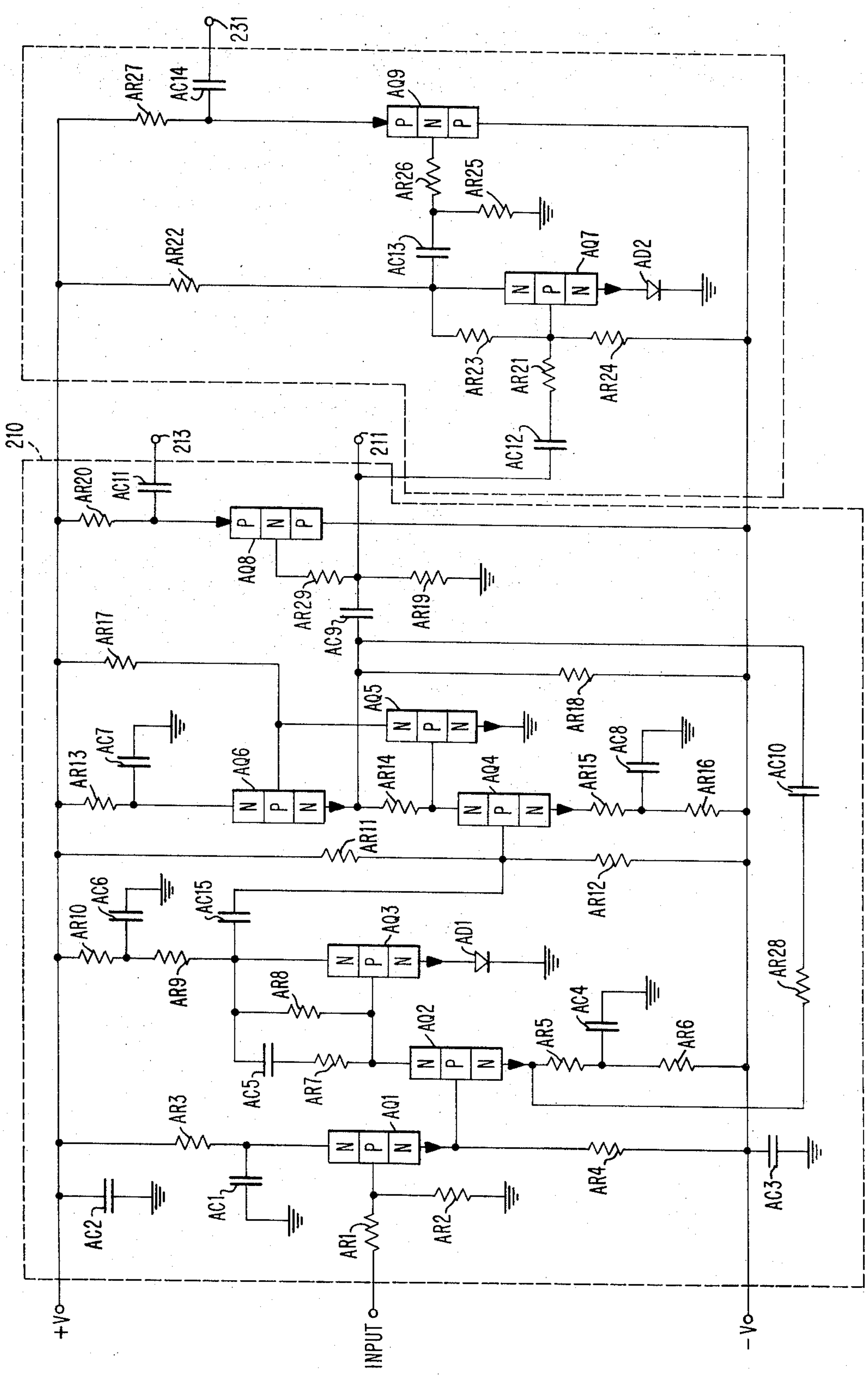
FIG. 4 is a detailed circuit diagram of an amplifying means which may be employed in an embodiment of the present invention.

As in the prior art, an analog input signal is presented to amplifying means 210, the circuit for which is shown in more detail in FIG. 4, which provides signal levels on lines 211 and 213 for driving the data detecting circuits 220, 230, 240.

The signals on lines 213 and 211 are the same waveform with an isolation due to input requirements of threshold detecting means 220 and peak detecting means 240.

Figure 5:
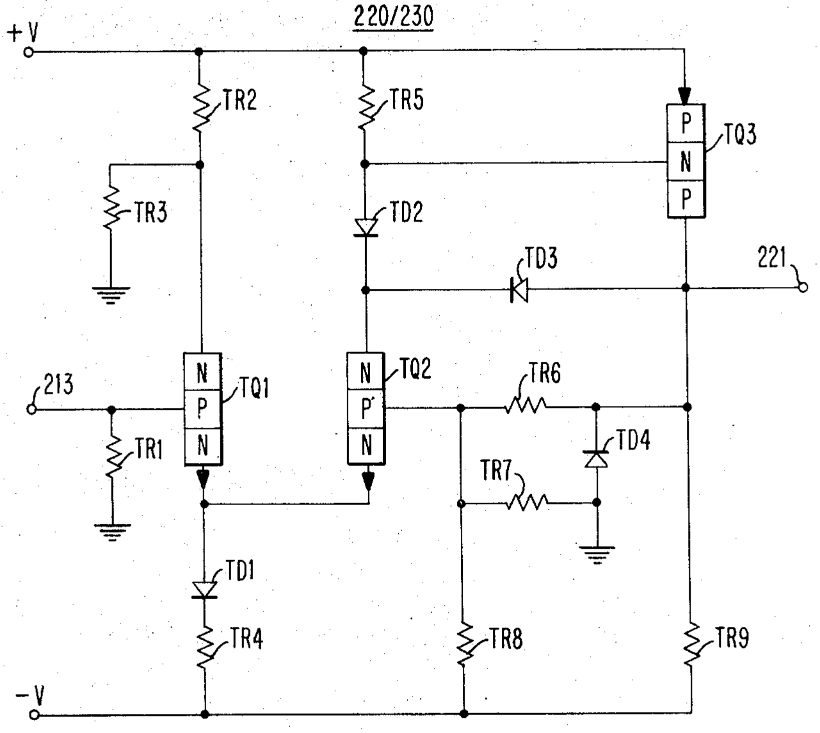
FIG. 5 is a detailed circuit diagram of a threshold detecting means which may be employed in an embodiment of the present invention.

To allow standardization of circuitry, an amplifier 232 having a gain of minus 1 is connected to output 211 of amplifying means 210 to provide an input 231 to threshold detecting means 230 so that the circuit shown in more detail in FIG. 5 is used for both threshold detectors 220 and 230 even though each is in effect acting on a different polarity of the input signal. The output line 221 of negative threshold detector 220 is connected to a first input of AND gate 250 with a second input 241 being the negative peak output from peak detecting means 240.

Respectively, the inputs to AND gate 260 are output line 233 from positive threshold detector 230 and positive peak output 243 from peak detecting means 240. Output line 95 from AND gate 250 is connected to a set input of data flip-flop 90 and output line 96 from AND gate 260 is connected to a reset input of data flip-flop 90. Data outputs of the data recovery system of the present invention appear on lines 91 and 93.

Referring now more specifically to FIG. 2*b*, assuming a data signal on lines 211, 213 with a negative going portion appearing first, line 221 shows an output signal from negative threshold detector 220 when a minus threshold is reached on the input signal. Due to the hysteresis of the threshold detecting means, as will be described in relation to FIG. 5, the threshold level is reduced in value to improve noise rejection and to guarantee a minimum output pulse width on line 221. Thus the input must decrease by a predetermined value before the output of 221 will return to its original state.

When the signal on line 211 reaches its peak value, peak detecting means 240 produces a digital output signal representing a negative peak of the input signal.

AND gate 250 upon the coincidence of digital signals on input lines 221 and 241 produces an output on line 95 with appropriate rise time and voltage level to set data flip-flop 90. Thus, output line 91 of data flip-flop 90 turns on and output line 93 turns off representing the presence of a data bit coincident with the peak of the signal on line 211.

Similarly, after being amplified by amplifier 232 which has a gain of minus 1, the data signal is presented on line 231 to threshold detector 230 which is the same circuit configuration as threshold detector 220. Threshold detector 230 produces an output signal on line 233 when a predetermined positive threshold is achieved. As with threshold detector 220, the threshold level switches to a lower value to insure higher signal-to-noise ratio and sufficient pulse width of the output on line 233. When the positive peak is achieved, peak detecting means 240 produces an output pulse on line 243 which is presented as one input to AND gate 260 with the second input being line 233. On the coincidence on the positive threshold signal on line 233 and the positive peak signal on line 243, AND gate 260, which has the same circuit configuration as AND gate 250, produces an output signal on line 96 sufficient to reset data flip-flop 90. Thus, output lines 91 and 93 are switched indicating the presence of a data bit signal.

Figure 3A:
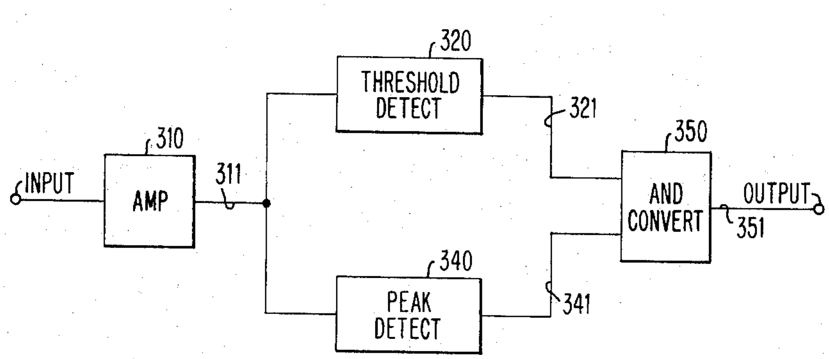
FIG. 3*a* is a block diagram of a second embodiment of a data recovery system according to the present invention.
Figure 3B:
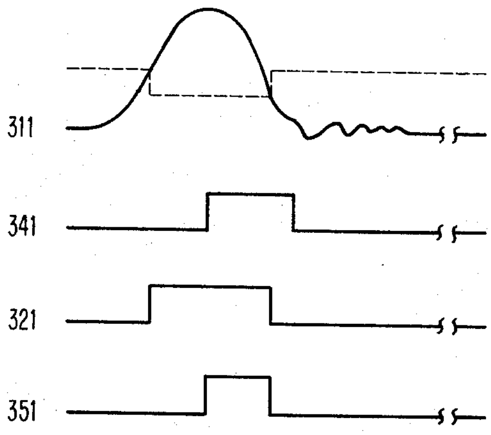
FIG. 3*b* is a timing chart showing the operation of the system of FIG. 3*a*.

Referring now to FIGS. 3*a* and 3*b*, a second embodiment of the present invention is shown in which the presence of an input signal represents a logical one and the absence of an input signal represents a logical zero. In this embodiment, only one polarity peak detecting means and threshold detecting means is required. Amplifying means 310 provides output on line 311 of sufficient magnitude and power to energize threshold detecting means 320 and peak detecting means 340. When the signal on line 311 exceeds a predetermined threshold level, threshold detecting means 320 produces an output signal on line 321 and the threshold level is reduced due to the inherent hysteresis of the circuit as described above.

When the signal on line 311 reaches a peak, peak detecting means 340 provides an output signal on line 341 as shown in FIG. 3*b*. As in FIG. 2*a*, the outputs of the threshold detecting means 320 and peak detecting means 340 are logically combined in gate means 350 which provides the data output on line 351. In a return-to-zero system as is described in conjunction with FIGS. 3*a* and 3*b*, there is no need for a data flip-flop as in the non-return-to-zero system described in connection with FIGS. 2*a* and 2*b*.

Referring now to FIG. 4, amplifiers 210 and 232 are shown in greater detail. Amplifier 210 receives as its input an analog data signal voltage. Voltage gain is adjusted by varying resistor AR28 to deliver an output signal at lines 211 and 213 of approximately 0.7 volts peak.

Amplifier 210 consists of two voltage amplifiers, AQ1, AQ2, and AQ3 being the first voltage amplifier and AQ4, AQ5 and AQ6 comprising the second voltage amplifier, with feedback AR28 and AC10 to control overall voltage gain.

AQ1 is am emitter follower to provide a high input impedance and to transfer the input voltage to the base of AQ2. AQ2 produces a current change at its collector which is fed to shunt feedback stage comprised of AQ3, AR8, AR9 and AD1. Resistors AR11 and AR12 provide bias voltage to the base of AQ4. Transistor AQ4 produces a current change at its collector in response to the voltage at the collector of AQ3. The current change at the collector of AQ4 is fed into shunt feedback stage comprised of AQ5, AQ6 and AR14.

Transistor AQ6 serves as an emitter follower buffer to provide drive capability. Capacitor AC9 combined with resistor AR19 provide AC coupling to output line 211.

Transistor AQ8 is an emitter follower, providing a buffer between output line 211 and output line 213 which is connected to negative threshold detecting means 220. Transistor AQ7 provides a gain of − 1 in negative amplifier 232. The collector of transistor AQ7 is coupled to emitter follower AQ9. The output 231 is connected to positive threshold detecting means 230. Referring now to FIG. 5, a threshold detecting means which may be used in the preferred embodiment of the present invention is described.

Input line 213 is connected to the base of transistor TQ1 which is the input half of an emitter coupled differential amplifier stage with transistor TQ2. The collector of transistor TQ2 is coupled to the base of common emitter amplifier TQ3 which provides a digital output at its collector on line 221. This digital output is fed back by resistor TR6 to the threshold level setting transistor base TQ2.

With no input signal, TQ1 is on and TQ2 is off. This holds TQ3 off and sets the threshold level at approximately minus 500 millivolts. This level is set by TD4, TR6, TR7 and TR8.

To change the state of the threshold detecting circuit 220, the input voltage level must exceed the value at the base of TQ2. When this occurs, TQ3 is turned on. This causes the threshold level at the base of TQ2 to be switched to approximately −200 millivolts.

Therefore, for the output to turn off, the input signal must be more positive than minus 200 millivolts. The operation of the threshold detecting means is clearly shown in the timing charts of FIGS. 2*b* and 3*b*.

Figure 6:
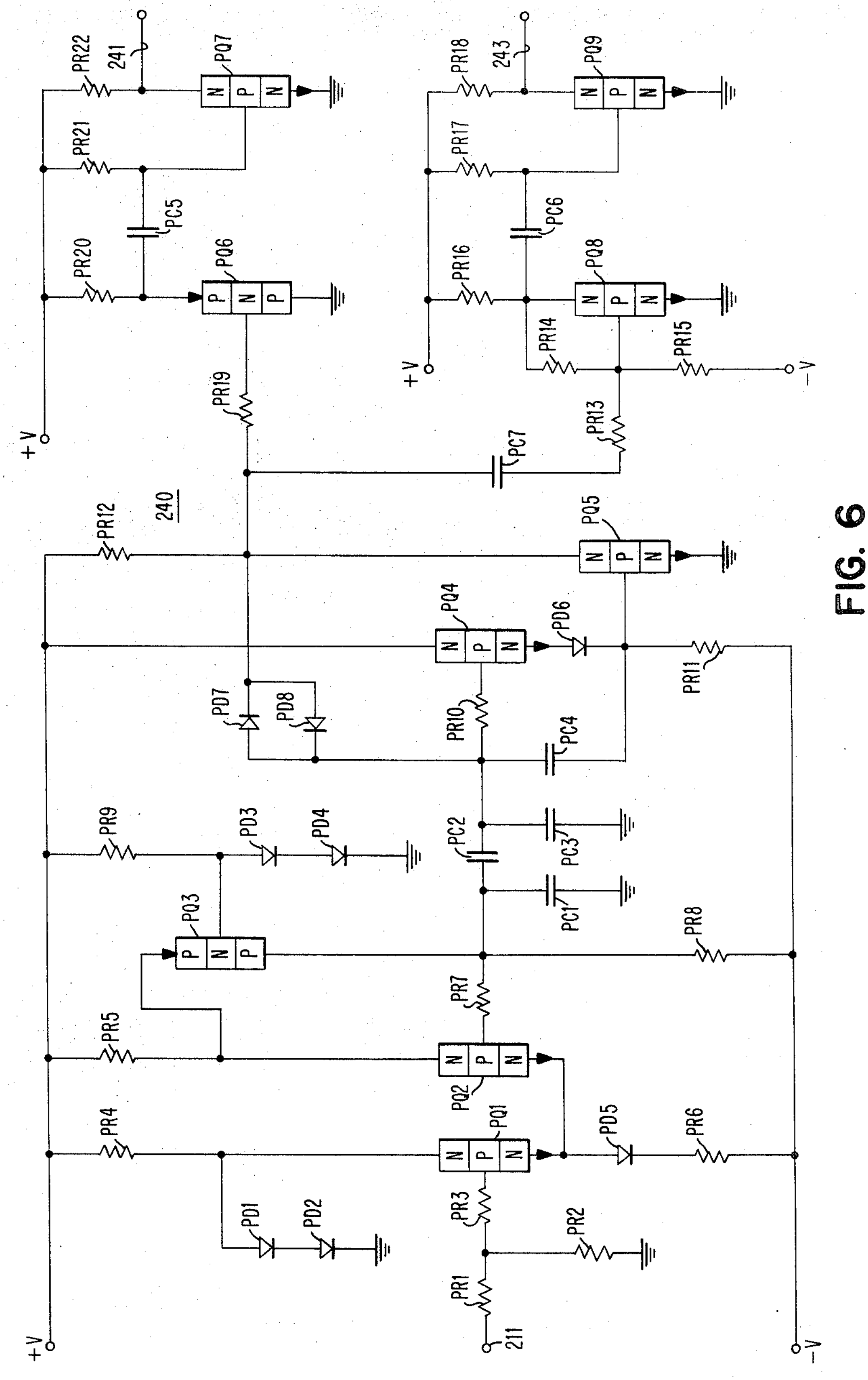
FIG. 6 is a detailed circuit diagram of a peak detecting means which may be employed in an embodiment of the present invention.

Referring now to FIG. 6, the detailed operation of a peak detecting means 240 suitable for use with a preferred embodiment of the present invention will be described.

Peak detecting means 240 is connected to the output of amplifier 210 by line 211. The peak detecting circuit 240 produces a digital output pulse for negative peaks on output line 241 and a digital output pulse for positive peaks on output line 243. The circuit acts as a differentiator in that when DE/DT is zero (at the peak of a voltage signal) the outputs change state.

Transistors PQ1, PQ2, and PQ3 form a unity gain amplifier providing a high input impedance, and a low output impedance. Resistors PR1 and PR2 attenuate the input signal by a ratio of approximately five to one.

Transistors PQ4, PQ5 diodes PD6, PD7, PD8 and capacitor PC2 form the differentiator. Capacitor PC2 is driven from the collector of PQ3 which is the output of the unity gain amplifier. The current in the capacitor is equal to C DE/DT. Therefore, if DE/DT is positive or negative it is followed by the current in PC2. This current then flows in PD7 or PD8 depending on the direction of the current. Transistors PQ4 and PQ5 form a shunt feedback amplifier for diodes PD7 and PD8.

If the input signal is in the form of a sine wave, as DE/DT goes from positive to negative (and therefore through a peak value) the current switches from diode PD7 to diode PD8. This produces a positive voltage change on the collector of PQ5. For negative peaks, where DE/DT is negative and goes positive, there is a negative voltage change on the collector of PQ5. These voltage changes are fed to transistors PQ6 and PQ8. PQ6 is an emitter follower which drives PQ7 a normally on output stage. If a negative peak is present, the emitter of PQ6 goes negative and is coupled to the base of PQ7 turning it off for a period of time as determined by the PR21, PC5 time constant. Therefore, transistor PQ7 indicates a negative input peak when its output is switched positive.

Transistor PQ8 provides a voltage gain of minus 1. PQ9 operates identically to PQ7 except its input from the collector of PQ8 is out of phase with the input to PQ7 and as a result indicates positive peaks rather than negative peaks.

Figure 7:
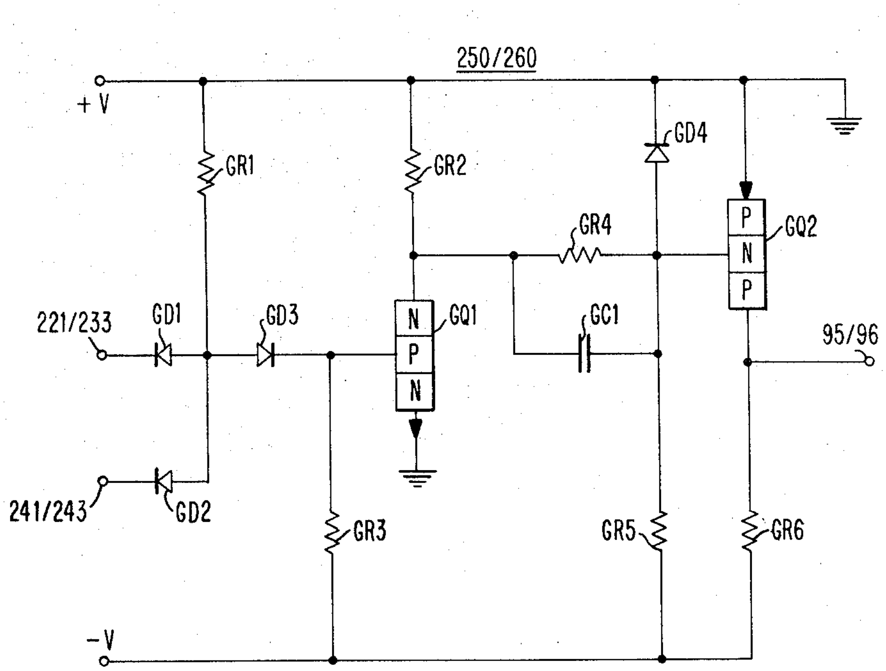
FIG. 7 is a detailed circuit diagram of a gating means which may be employed in an embodiment of the present invention.

Referring now to FIG. 7, the GATE means 250, 260 is shown in detail. Each AND gate has two inputs. A first input to each circuit may be the output of the respective threshold detecting means 220 or 230 on lines 221 or 233 and a second input is the output of the respective negative peak output line 241 or positive peak output line 243 of peak detecting means 240. A logical AND function is performed by circuit 250, 260 to eliminate noise on the output of peak detector 240.

Diodes GD1 and GD2 with resistor GR1 provide the logic AND function. Resistors GR2 and GR3 with transistor GQ1 invert the AND signal. Resistors GR4 and GR5 provide a negative shift of a signal at the collector of GQ1 and allow transistor GQ2 to be switched. The collector of GQ1 is coupled to the base of GQ2 which is connected in common emitter configuration with the output taken from the collector of GQ2 on lines 95, 96. When both inputs (221 and 241 or 233 and 243) are positive, resistor GR1 turns on transistor GQ1 which causes a negative voltage to be presented to the base of GQ2 which causes an output signal to be presented on lines 95, 96.

Data flip-flop 90 is a bi-stable multivibrator of the type which is well-known in the art as evidenced by the prior art shown in FIG. 1.

From the preceding description of preferred embodiments of the present invention it is clear that an improved data recovery system is presented in which the logical combining of peak detecting means with controlled threshold detecting means provides a stable jitter-free recovered data signal.

What is claimed is:

1. A data recovery system, comprising means for providing an input voltage signal;
   - peak detecting means for detecting a peak value of said input voltage signal;
   - threshold detecting means for detecting said input voltage signal at a value less than said peak value said threshold detecting means further comprising means for switching a threshold level from a first threshold level to a second threshold level in response to said input voltage signal exceeding said first threshold level to improve noise immunity; and
   - gate means for logically combining an output of said peak detecting means with an output of said threshold detecting means to provide a recovered data output signal.

2. A data recovery system according to claim 1 wherein said peak detecting means comprises means for detecting positive and negative peaks of said input voltage signal; and
   - said threshold detecting means comprises means for detecting a positive and a negative threshold value of said input voltage signal.

3. A data recovery system according to claim 1 wherein said means for providing an input voltage comprises voltage and power amplifying means to provide input signals to said peak detecting means and said threshold detecting means.

4. A data recovery system according to claim 3 wherein said amplifying means further comprises an amplifier circuit having a gain of minus 1 to provide an input signal to a portion of said threshold detecting means.

5. A data recovery system according to claim 1 further comprising,
   - a delay line;
   - an input transducer to provide an input signal to said delay line;
   - an output transducer to detect an output signal from said delay line;
   - and storage means connected to the output of said gate means for storage of said recovered data output signal.

* * * * *